(12) United States Patent
Edwards

(10) Patent No.: US 6,910,645 B1
(45) Date of Patent: Jun. 28, 2005

(54) GARDENING PRODUCT DISPENSING SYSTEMS AND METHODS

(76) Inventor: Darlene Edwards, 316 NW. 16th St., Grand Prairie, TX (US) 75050-5250

( * ) Notice: Subject to any disclaimer, the term of this patent is extended or adjusted under 35 U.S.C. 154(b) by 147 days.

(21) Appl. No.: 10/236,776

(22) Filed: Sep. 6, 2002

(51) Int. Cl.$^7$ ............................................. A01C 15/00
(52) U.S. Cl. ..................... 239/650; 239/663; 239/661; 222/164
(58) Field of Search ................... 239/663, 650, 239/661; 222/171, 191, 164; 56/16.8, 249

(56) References Cited

U.S. PATENT DOCUMENTS

| | | | | |
|---|---|---|---|---|
| 1,876,409 A | * | 9/1932 | Gordon | .................. 56/249 |
| 2,792,970 A | * | 5/1957 | Gaiman | .................. 222/164 |
| 3,102,375 A | * | 9/1963 | Troka et al. | .................. 56/255 |
| 3,375,644 A | * | 4/1968 | Harper | .................. 56/16.8 |
| 3,477,212 A | * | 11/1969 | Coffman | .................. 56/16.8 |
| RE32,067 E | * | 1/1986 | Emory | .................. 56/16.8 |
| 5,385,306 A | * | 1/1995 | Cervenka | .................. 239/663 |
| 5,485,963 A | * | 1/1996 | Walto et al. | .................. 239/663 |

* cited by examiner

*Primary Examiner*—Dinh Q. Nguyen
(74) *Attorney, Agent, or Firm*—Sanford E. Warren, Jr.; James J. Murphy; Winstead, Sechrest & Minick

(57) ABSTRACT

A dispensing system for dispensing gardening products includes a container for holding a selected gardening product and rotating means internal to said container for stirring the selected gardening product stored in the container. A dispersal aperture through the container disperses the selected product from the container after stirring. At least one dispensing system wheel external to the container and coupled to the rotating means is adapted to frictional engage a lawnmower wheel and thereby rotate the rotating means in response to rotation of the lawnmower wheel.

16 Claims, 5 Drawing Sheets

GARDENING PRODUCT DISPENSING SYSTEMS AND METHODS

BACKGROUND OF THE INVENTION

1. Field of Invention

The present invention relates in general to gardening and in particular, to gardening product dispensing systems and methods.

2. Background of Invention

Lawn care is one of the major tasks faced by any gardener or homeowner. Lawns not only typically cover relatively large areas of the landscape but also require consistent attention to maintain their appearance. Periodic mowing, watering, fertiziling, re-seeding and edging are only a few of the tasks the gardener must consistently perform in order to maintain a well-manicured lawn. Depending on such factors as the size of the lawn, the slope on which the lawn in planted, the condition of the grass itself and the weather, lawn maintenance can be a physically demanding and time consuming for even the most dedicated and experienced gardeners.

One particular lawn care task that is normally very inefficient (e.g. time consuming and labor intensive) is the dispersal of dry lawn care products such as dry fertilizers, grass seed, insecticides, and the like. The small hand-cranked, hand-carried dispenser often used by home gardeners typically disperse the given product over a relatively small area of a few square yards. Hence, numerous traversals of the area can become necessary if a large lawn is involved. Additionally, this type of dispenser often does not provide uniform dispersal of product, depending on the consistency the hand cranking and the walking speed and the direction of the gardener. The larger, wheeled (manually pushed) spreaders provide for the dispersal of dry lawn care products on a bulk basis. However, the efficiency of wheeled spreaders is again a function of the consistency action of the gardener, such as the overlap of the gardener's paths across the lawn and the speed of the traversal, over the ground. Maintaining consistent paths and speed can be especially difficult when the spreader is heavy and hard to push. Moreover, the flow of the product through the spreader can at times be impeded as the product forms clods or sticks within the container walls.

Hence, what is needed are new apparatus and methods for efficiently dispersing dry card products. Among other things, such apparatus and methods should reduce the physical strains and time demands on the gardener.

SUMMARY OF INVENTION

The principles of the present invention advantageously allow the efficient dispersion of lawn care and similar gardening products in an efficient manner. According to one exemplary embodiment, A dispensing system is disclosed for dispensing gardening products includes a container for holding a selected gardening product and rotating means internal to said container for stirring the selected gardening product stored in the container. A dispersal aperture through the container disperses the selected product from the container after stirring. At least one dispensing system wheel external to the container and coupled to the rotating means is adapted to frictional engage a lawnmower wheel and thereby rotate the rotating means in response to rotation of the lawnmower wheel.

Methods, apparatus and system embodying the inventive principles make the process or dispersing gardening product less strenuous and less time consuming. Among other things, the processing of dispersing the given product can be done concurrently with mowing a lawn or other surface area. The internal rotating mechanism ensures that the product is sufficiently broken up to flow to the underlying ground relatively unimpeded and in a controlled and consistent fashion. Moreover, when used in conjunction with a power lawnmower, dispensing apparatus and systems according to the inventive principles significantly reduce the physical demands on the gardener.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–14 of the drawings, in which like numbers designate like parts.

Figure 1A:
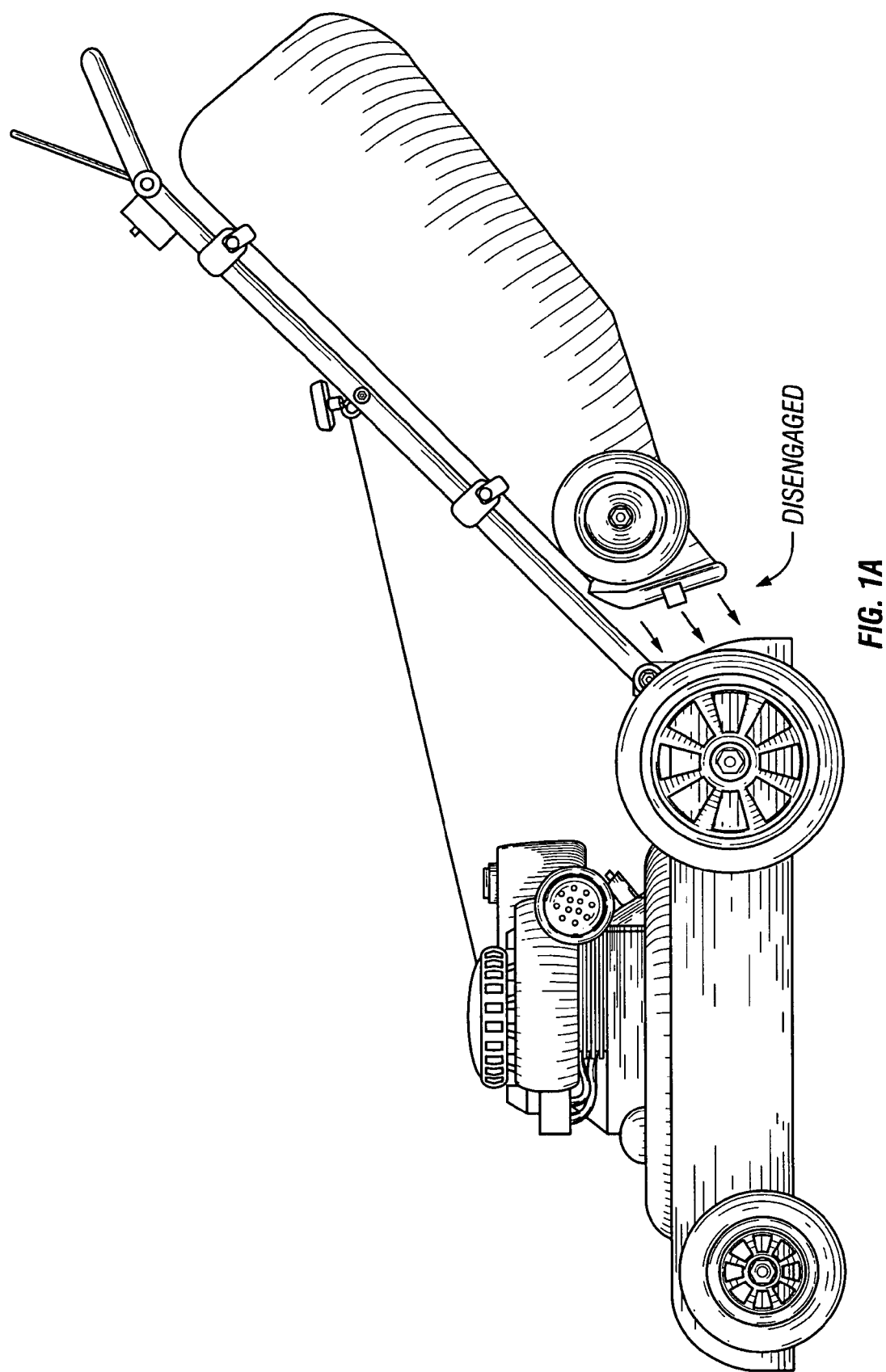
FIG. 1A is a side elevational view of a representative lawn mower-product dispenser assembly embodying the principles of the present invention, in this view the lawn mower rear wheels are disengaged from the product dispenser wheels.

FIG. 1A is a side elevational view of a representative lawn mower-product dispenser assembly 100 embodying the principles of the present invention. Lawn mower-dispenser assembly 100 includes a conventional lawn mower 101 and a dispenser assembly 102.

In the depicted embodiment, a gasoline engine 103 powers lawn mower 101. In alternate embodiments, lawn mower 101 may be a manual push mower or powered by another type of power source, such as an electric motor. Lawn mower 101 includes conventional front and rear wheels, two of which are shown at 104 and 105 respectively for the side of lawn mower-dispenser assembly 100 visible in FIG. 1. Also shown are a standard handle assembly 106 including a handgrip 107 and motor control bar 108. Handle assembly 106 is generally U-shaped, including a pair of arms and a crossbar therebetween, as shown in further detail in the rear view of mover—dispenser assembly 100 provided in FIG. 3.

Dispenser assembly 102 includes wheels 110 (one of which is visible in the side view of FIG. 1) and a lawn care product container 111. Wheels 110 drive the internal dispensing mechanism discussed below to disperse a dry or solid lawn care product loaded into container 111 on the underlying ground during movement of mower 101. Container 111 is either hardsided, constructed out of metal or plastic, or softsided, constructed from canvas or a similar flexible material. In the illustrated embodiment, container 111 is depicted as hardsided.

Dispenser assembly 102 slidably attaches to the handle assembly 106 of lawn mower 101 with a set of clamps 109. In the illustrated embodiment, two clamps 109a and 109b provide for each side (arm) of handle assembly 105. Clamps 109 include screws, thumbscrews, or the like that allow the friction applied between clamps 109 and handle assembly to be increase or decreased. In turn, dispenser 102 can be slid along handle assembly 106 such that wheels 110 be functionally engaged and disengaged from the rear wheels of lawn mower 101.

In FIG. 1A, dispenser 102 is disengaged from rear wheels 105 of lawn mower 101. In the disengaged position, dispenser 102 is slid up and away from the rear wheels 105 along the arms of handle assembly 106. When disengaged, dispenser wheels 110 are spaced from wheels 105 of lawn mower 101; therefore, rotation of dispenser wheels 110 is substantially independent from the rotation of rear lawn mower wheels 105 during movement of lawn mower 101.

Figure 1B:
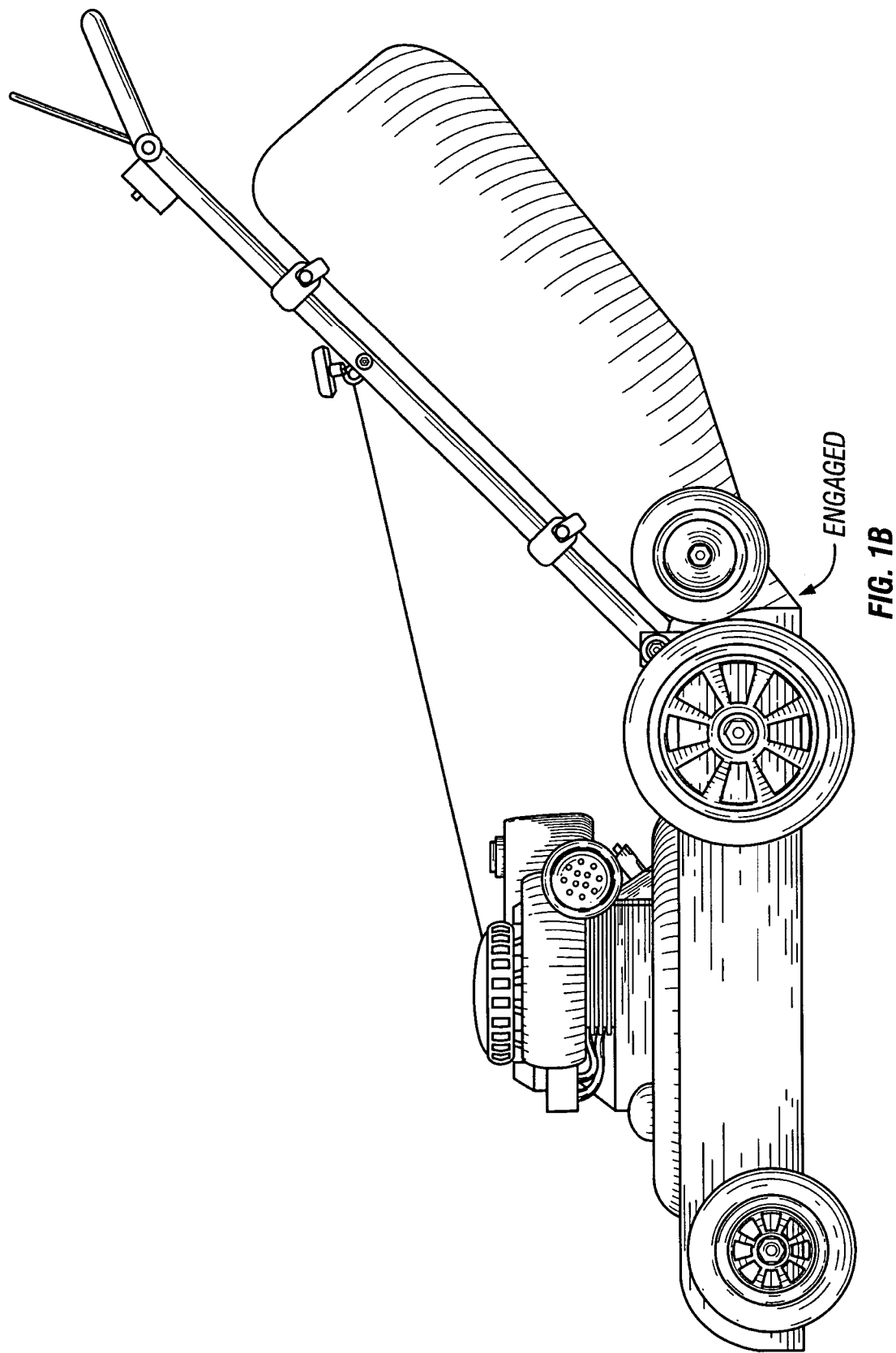
FIG. 1B is a side elevational view of the lawn mower-product dispenser assembly of FIG. 1A illustrating the engaged configuration between lawn mower rear wheels and the product dispenser wheels.

The engaged configuration between lawn mower rear wheels 105 and dispenser wheels 110 is shown in FIG. 1B. Here, dispenser 102 is slid down the arms of handle assembly 106 such that lawn mower rear wheels 105 and dispenser wheels 110 are in contact. The rotational friction between the two sets of wheels 105 and 110 is sufficient such that a rotation of lawn mower rear wheels 105 causes a corresponding rotation of dispenser wheels 110. The rotation of dispenser wheels 110 in turn drives the internal product dispersion mechanism described further below.

Dispenser 102 can be also be detached from lawnmower 102 for independent use. In this case, handles 112 are provided for manually pushing dispenser assembly 102 across the ground directly on dispenser wheels 110.

Figure 2:
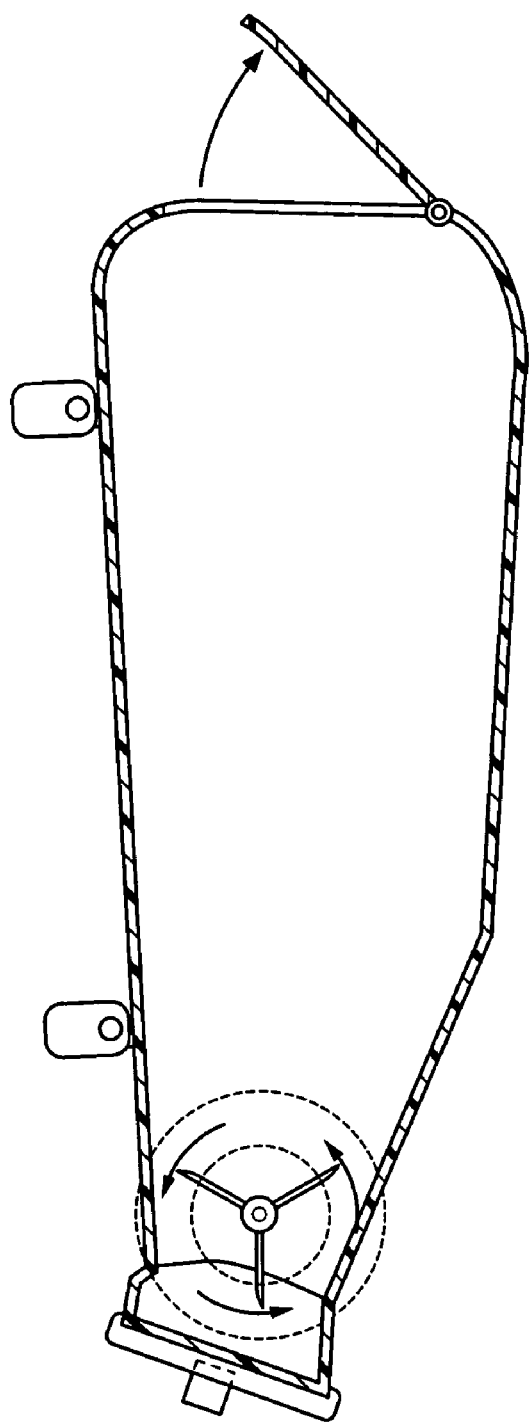
FIG. 2 is a cross-sectional side view of product dispenser of FIG. 1A.

FIG. 2 is a cross-sectional side view of container 111. Container 111 includes a hinged door or flap 201 on its upper (wider) end for receiving dry and solid lawn care products, such as fertilizer, seeds, herbicides, insecticides or the like. Within the lower (narrow) end of container 111 is a dispersion mechanism 202, which rotates with the rotation of dispenser wheels 110. (At least the bottom wall 113, as shown in FIGS. 1A and 1B, is sloped inward towards dispersion mechanism 202 such that material within container 111 flows under gravity towards dispersion mechanism 202 under relatively upright conditions). Dispersion mechanism 202, shown in further detail in FIG. 2, breaks-up the material introduced into container 111 and ensures that such material properly flows from dispensing aperture 203. Dispensing aperture 203 is described further below with respects to FIGS. 4 and 5.

Figure 3:
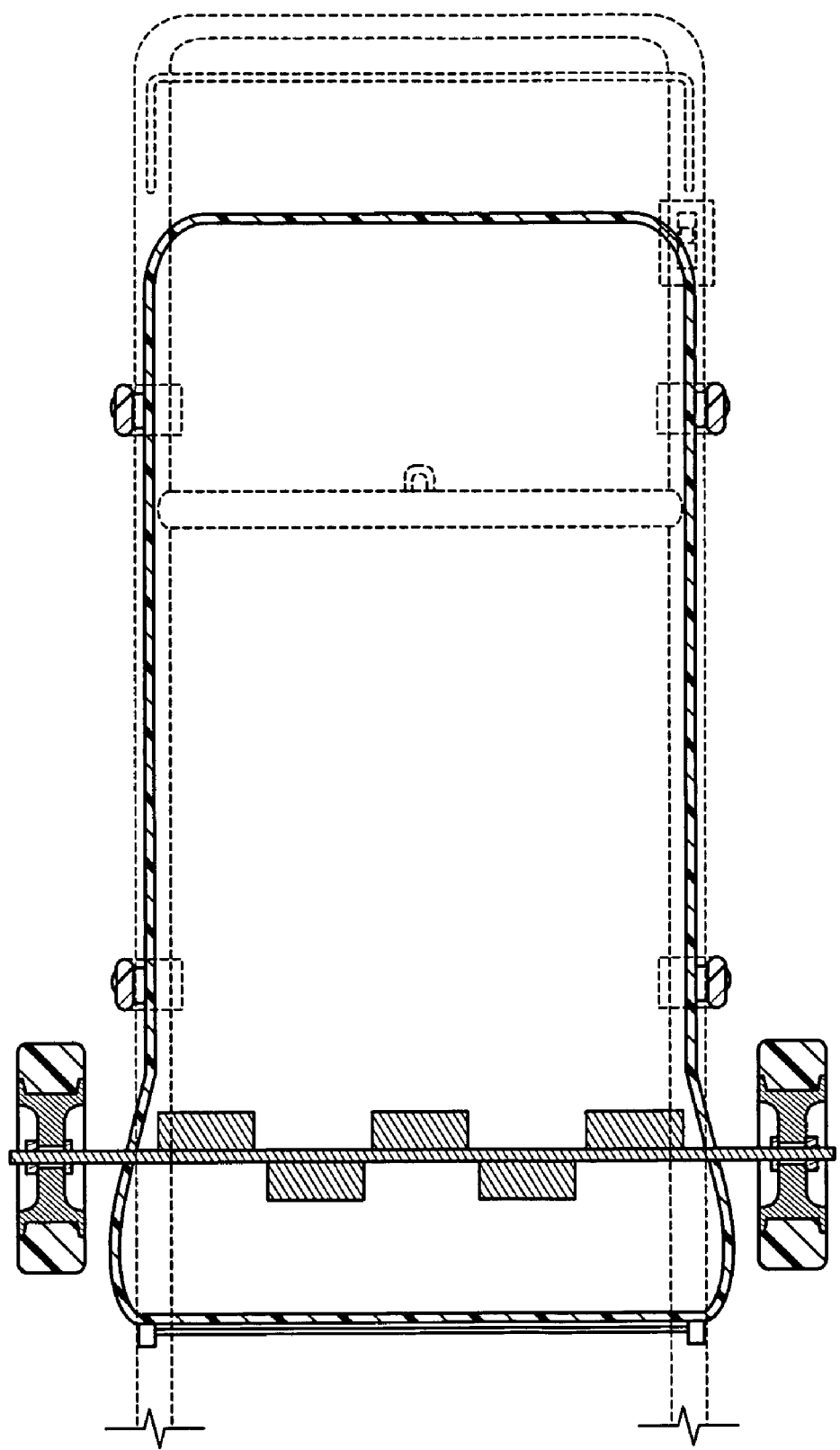
FIG. 3 is a rear cross-sectional view of the lawn mover-product dispenser assembly of FIG. 1A.

FIG. 3 is a cross-sectional rear view of container 111, as attached to lawn mower handle assembly 106. Dispersion mechanism 202 includes a plurality of projections or paddles 301 extending from an axle or rod 302. As shown in both FIGS. 2 and 3, projections 301 are spaced laterally apart along axle 302 and disposed at varying angles with respects to one another to insure that material can flow to dispensing aperture 203 no matter the current position of dispersion mechanism 202. While projections 301 are depicted as relatively flat, solid structures, in alternate embodiments projections 301 could themselves include apertures therethrough, be made of a mesh material, and/or have a degree of curvature.

Axel 302, which is preferrably constructed of metal or the like, extends the through the sidewalls of container 111 at points 303a and 303b. Bearings or bushings may be provided at points 303a and 303b to ensure that axle 302 freely rotates and that material within container 303 does not leak to the outside. Dispenser wheels 110 are afixed to the ends of axle 302 by bolts, screws or a similar conventional mechanical linkage 304a–304b.

Hence a rotation of dispenser wheels 110, whether by direct contact with the ground or by rotation of lawn mower real wheels 105, causes axle 302 to correspondingly rotate. Consequently, projections 301 rotate to mix and break-up the product introduced in container 111. This mixed and broken-up material can then more easily pass through dispensing aperture 203.

Figure 4:
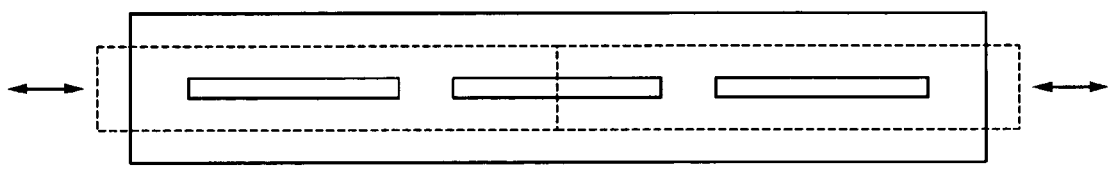
FIG. 4 is plan view of one embodiment of the dispensing aperture shown in FIG. 2.
Figure 5:
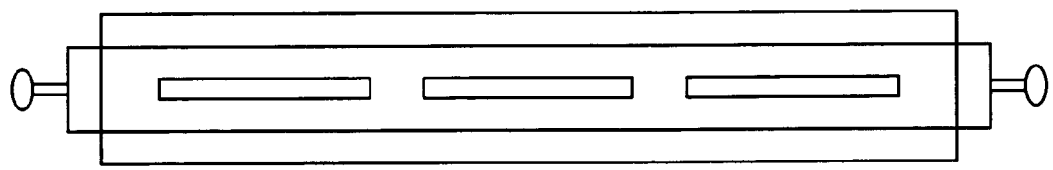
FIG. 5 is a plan view of a second embodiment of the dispensing aperture shown in FIG. 2.

Dispensing aperture 203 is shown in further detail in FIGS. 4 and 5. In the embodiment of FIG. 4, dispensing aperture 203 includes three spaced-apart apertures, 401a–401b which provide communication between the interior of container 111 and the underlying ground. A pair of strips or sheets 402a and 402b of plastic or metal slide laterally with respects to apertures 401a–401b to selectively cover and uncover aperture 401a–401c. For example, if dispenser assembly 102 is not in use, yet contains lawn care product, strips 402a–402b can be slid inward (together) to completely close off apertures 401a–401c and thereby halt the exit of material from container 111. By increasingly sliding outward one or both of strips 402a and 402b, the material flow out of container 111 can be increased and the product dispersion area widened.

The embodiment of disposing aperture 203 of FIG. 5 includes three apertures 501a–501c for passing material from container 111 to the underlying ground. A rotating (hinged or swiveled) flap or cover 502 allows apertures 501a–501c to be completely closed to prevent material flow-through, or opened by a selective amount to allow a controlled material flow to the ground. Knobs or handles 503a–503b provide for manual swiveling of flap 502, as required.

In the preferred operation, dispenser assembly 102 is attached to lawn mower 101 generally as shown in FIGS. 1–3. The material to be spread or dispersed is loaded into container 111 through access door 201. With dispenser wheels 110 engaged with lawn mower rear wheels 105, as mower 101 rolls across the ground, dispersion mechanism 202 rotates to mix and break-up the material loaded into container 111. Depending on the setting of dispensing aperture 203, this material then funnels down the walls of container 111 and is dispensed across the ground through dispensing aperture 203 with the movement of the mower 111.

In sum, lawn care products can be applied concurrently with mowing of a lawn, thereby reducing the amount of work and time required by the gardener. If a power mower 101 is used, the physical strain is further reduced. Moreover, a wide variety of dry and solid materials, such as pelletized or powdered lawn care products, can be dispensed using dispenser assembly 102, either alone or in combination with lawn mower 101.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A dispensing system for dispensing gardening products comprising:
    a container for holding a selected gardening product;
    an attachment means for slidably attaching the dispensing system to a handle assembly of a lawnmower, the attachment means allowing at least one wheel of the dispensing system to be directly and slidably engaged and disengaged with a lawnmower wheel;
    a rotating means internal to the container for stirring the selected gardening product stored in the container, the rotating means having an axle extending into a least a portion of the container and through at least one sidewall of the container to couple with at least one dispensing system wheel, the at least one dispensing system wheel positioned externally of the container and coupled to the rotating means, and wheel adapted to frictional engage a lawnmower wheel and thereby rotate the rotating means in response to rotation of the lawnmower wheel;
    a plurality of spaced apart projections affixed to the axle for stirring the selected gardening product upon rotation of the axle by the dispensing system wheel; and
    a dispersal aperture through the container for dispersing the selected product from the container after stirring by the rotating means.

2. The system of claim 1 wherein at least one sidewall of said container slopes towards said rotating means and said dispersal aperture such that the selected gardening product flows under gravity towards said rotating means and said dispersal aperture.

3. The system of claim 1 wherein the selected gardening product comprises a solid lawn care product selected from the group consisting of fertilizers and seeds.

4. The system of claim 1 wherein said container comprises sidewalls formed of a rigid material.

5. The system of claim 1 further comprising sliding cover means for selectively covering at least a portion of said dispensing aperture.

6. The system of claim 1 further comprising swiveling cover means for selectively covering at least a portion of said dispensing aperture.

7. The system of claim 1 wherein said dispensing system wheel is further adapted to rotate said rotating means in response to direct contact between said dispensing system wheel and the ground.

8. The system of claim 1 forms an enclosure further comprising an aperture and aperture cover means for introducing the selected gardening product into said container.

9. A lawn care system comprising:
    a lawnmower including a set of wheels for moving the lawnmower across a lawn and a handle system for manual engagement by an operator; and
    a container for holding a selected lawn care product;
    a stirring means internal to said container for stirring the selected lawn care product stored within the container;
    means for transferring rotational energy from a least one of the set of wheels of the lawnmower during movement of the lawnmower to the stirring means;
    a dispenser system slidably attached to the handle system of the lawnmower such that the means for transferring rotational energy can be selectively engaged and disengaged with the at least one of the set of wheels of the lawnmower via frictional engagement; and
    at least one aperture through said container for dispersing stirred lawn care product to the lawn.

10. The lawn care system of claim 9 wherein the lawnmower is a powered lawnmower.

11. The lawn care system of claim 9 wherein the lawnmower is a push mower.

12. The lawn care system of claim 9 wherein the container of the dispenser system is adapted to receive a lawn care product selected from the group consisting of powered, solid and pelletized lawn care products.

13. The lawn care system of claim 9 further comprising means for controlling dispensing of the lawn care product through the at least one aperture through the container.

14. A method of dispersing a gardening product across a surface comprising the steps of:
    providing an attachment means for slidably attaching a dispensing system to a handle assembly of a lawnmower, the attachment means allowing a dispensing system wheel to be selectively and slidably engaged and disengaged with a lawnmower wheel;
    a rotating means internal to a container for stirring a selected gardening product stored in the container, the rotating means having an axle extending into a least a portion of said container and through at least one sidewall of the container to couple with at least one dispensing system wheel;
    a plurality of spaced apart projections affixed to the axle for stirring the selected gardening product upon rotation of the axle via the dispensing system wheel;
    a dispersal aperture through the container for dispersing the selected product from the container after stirring by said rotating means; and
    at least one dispensing system wheel external to said container and coupled to said rotating means, said wheel adapted to frictional engage a lawnmower wheel and thereby rotate said rotating means in response to rotation of the lawnmower wheel;
    storing a selected gardening product in the container;
    rotating the stirring mechanism with at least one wheel external to the container and affixed to the stirring mechanism;
    stirring the gardening product stored in the container with an internal rotating stirring mechanism; and
    dispersing stirred gardening product through an aperture in the container.

15. The method of dispersing a gardening product of claim 14 wherein said step of rotating the stirring mechanism comprises the substep of frictionally engaging the at least one wheel affixed to the stirring mechanism with a corresponding wheel of a lawnmower.

16. The method of dispersing a gardening product of claim 14 wherein said step of rotating the stirring mechanism comprises the substep of pushing the at least one wheel affixed to the stirring mechanism across the ground.

* * * * *